(12) United States Patent
Ishii

(10) Patent No.: US 12,096,110 B2
(45) Date of Patent: Sep. 17, 2024

(54) IMAGE-PROCESSING APPARATUS FOR INDICATING A RANGE WITHIN AN INPUT IMAGE, PROCESSING METHOD, AND MEDIUM

(71) Applicant: CANON KABUSHIKI KAISHA, Tokyo (JP)

(72) Inventor: Masatoshi Ishii, Koganei (JP)

(73) Assignee: Canon Kabushiki Kaisha, Tokyo (JP)

( * ) Notice: Subject to any disclaimer, the term of this patent is extended or adjusted under 35 U.S.C. 154(b) by 1027 days.

(21) Appl. No.: 16/940,655

(22) Filed: Jul. 28, 2020

(65) Prior Publication Data

US 2020/0358964 A1 Nov. 12, 2020

Related U.S. Application Data

(63) Continuation of application No. PCT/JP2019/002199, filed on Jan. 24, 2019.

(30) Foreign Application Priority Data

Feb. 20, 2018 (JP) .................................. 2018-028112
Nov. 8, 2018 (JP) .................................. 2018-210844

(51) Int. Cl.
*H04N 23/63* (2023.01)
*G06T 3/08* (2024.01)
(Continued)

(52) U.S. Cl.
CPC ............. *H04N 23/635* (2023.01); *G06T 3/08* (2024.01); *H04N 9/3185* (2013.01); *H04N 1/00278* (2013.01)

(58) Field of Classification Search
None
See application file for complete search history.

(56) References Cited

U.S. PATENT DOCUMENTS 8,941,769 B2 1/2015 Sekiya
2008/0143978 A1* 6/2008 Damera-Venkata ......................... H04N 9/3188
348/E9.027

(Continued)

FOREIGN PATENT DOCUMENTS

JP 2001-184040 A 7/2001
JP 2004-032076 A 1/2004
(Continued)

OTHER PUBLICATIONS

Mar. 12, 2019 International Search Report in International Patent Appln. No. PCT/JP2019/002199.

(Continued)

*Primary Examiner* — Quan Pham
(74) *Attorney, Agent, or Firm* — Venable LLP

(57) ABSTRACT

There is provided with an image-processing apparatus for indicating a range, which is displayed by a device or a system comprising a display area for displaying an image, within an input image. A first obtaining unit obtains information that represents a display form of the device or the system comprising the display area. A second obtaining unit obtains input image data representing the input image. An identification unit identifies the range, which is displayed in the display area, within the input image based on the input image data and the information. An output unit outputs information that represents the identified range. A shape of the identified range depends on the display area that corresponds to at least a curved screen or a plurality of flat screens.

11 Claims, 19 Drawing Sheets

(51) Int. Cl.
H04N 1/00       (2006.01)
H04N 9/31       (2006.01)

(56)            References Cited

U.S. PATENT DOCUMENTS

| | | |
|---|---|---|
| 2010/0060664 A1 | 3/2010 | Kilpatrick, II et al. |
| 2013/0016257 A1 | 1/2013 | Sekiya |
| 2014/0201666 A1* | 7/2014 | Bedikian .................. G06F 3/017 |
| | | 715/771 |
| 2016/0182579 A1* | 6/2016 | Tsang .................. H04L 65/1069 |
| | | 709/204 |
| 2018/0039079 A1* | 2/2018 | Lin .......................... G06F 3/011 |
| 2018/0220071 A1* | 8/2018 | Oshima .................. G06T 3/4038 |
| 2018/0374192 A1* | 12/2018 | Kunkel .................. H04N 23/58 |

FOREIGN PATENT DOCUMENTS

| | | |
|---|---|---|
| JP | 2005-234698 A | 9/2005 |
| JP | 2006-197642 A | 7/2006 |
| JP | 2012-508406 A | 4/2012 |
| JP | 2013-020063 A | 1/2013 |
| WO | 2010/028407 A1 | 3/2010 |

OTHER PUBLICATIONS

Nov. 22, 2022 Japanese Official Action in Japanese Patent Appln. No. 2018-210844.

* cited by examiner

IMAGE-PROCESSING APPARATUS FOR INDICATING A RANGE WITHIN AN INPUT IMAGE, PROCESSING METHOD, AND MEDIUM

CROSS-REFERENCE TO RELATED APPLICATIONS

This application is a Continuation of International Patent Application No. PCT/JP2019/002199, filed Jan. 24, 2019, which claims the benefit of Japanese Patent Application No. 2018-028112, filed Feb. 20, 2018, and Japanese Patent Application No. 2018-210844, filed Nov. 8, 2018, all of which are hereby incorporated by reference herein in their entirety.

BACKGROUND OF THE INVENTION

Field of the Invention

The present invention relates to an image processing technique for supporting imaging with an imaging apparatus.

Background Art

An existing display device such as a display displays a partial image that is cut from an image that is obtained by imaging. For this purpose, there is an imaging support technique on the assumption that a display device displays an image. PTL 1 discloses a technique for superimposing a marker that represents a region that is presumably to be displayed by a display device on an image that is obtained by imaging during imaging.

In PTL 1, the region that is presumably to be displayed by the display device is merely represented by the marker. However, in some cases where the display device displays a partial image that is cut from the image, there is a possibility that a display area is not represented by a marker. Thus, the existing technique does not necessarily enable a marker that represents the region in which the image is to be displayed by the display device to be appropriately generated.

CITATION LIST

Patent Literature

PTL 1: Japanese Patent Laid-Open No. 2006-197642

SUMMARY OF THE INVENTION

According to an embodiment of the present invention, an image-processing apparatus for indicating a range, which is displayed by a device or a system comprising a display area for displaying an image, within an input image, comprises: first obtaining unit configured to obtain information that represents a display form of the device or the system comprising the display area; a second obtaining unit configured to obtain input image data representing the input image; an identification unit configured to identify the range, which is displayed in the display area, within the input image based on the input image data and the information; and an output unit configured to output information that represents the identified range, wherein a shape of the identified range depends on the display area that corresponds to at least a curved screen or a plurality of flat screens.

According to another embodiment of the present invention, a non-transitory computer-readable medium stores a program which, when executed by a computer comprising a processor and a memory, causes the computer to perform an image processing method for indicating a range, which is displayed by a device or a system comprising a display area for displaying an image, within an input image, the method comprising: obtaining information that represents a display form of the device or the system comprising the display area; obtaining input image data representing the input image; identifying the range, which is displayed in the display area, within the input image based on the input image data and the information; and outputting information that represents the identified range, wherein a shape of the identified range depends on the display area that corresponds to at least a curved screen or a plurality of flat screens.

According to still another embodiment of the present invention, an image processing method for indicating a range, which is displayed by a device or a system comprising a display area for displaying an image, within an input image, comprises: obtaining information that represents a display form of the device or the system comprising the display area; obtaining input image data representing the input image; identifying the range, which is displayed in the display area, within the input image based on the input image data and the information; and outputting information that represents the identified range, wherein a shape of the identified range depends on the display area that corresponds to at least a curved screen or a plurality of flat screens.

Further features of the present invention will become apparent from the following description of exemplary embodiments with reference to the attached drawings.

DESCRIPTION OF THE EMBODIMENTS

Figure 1:
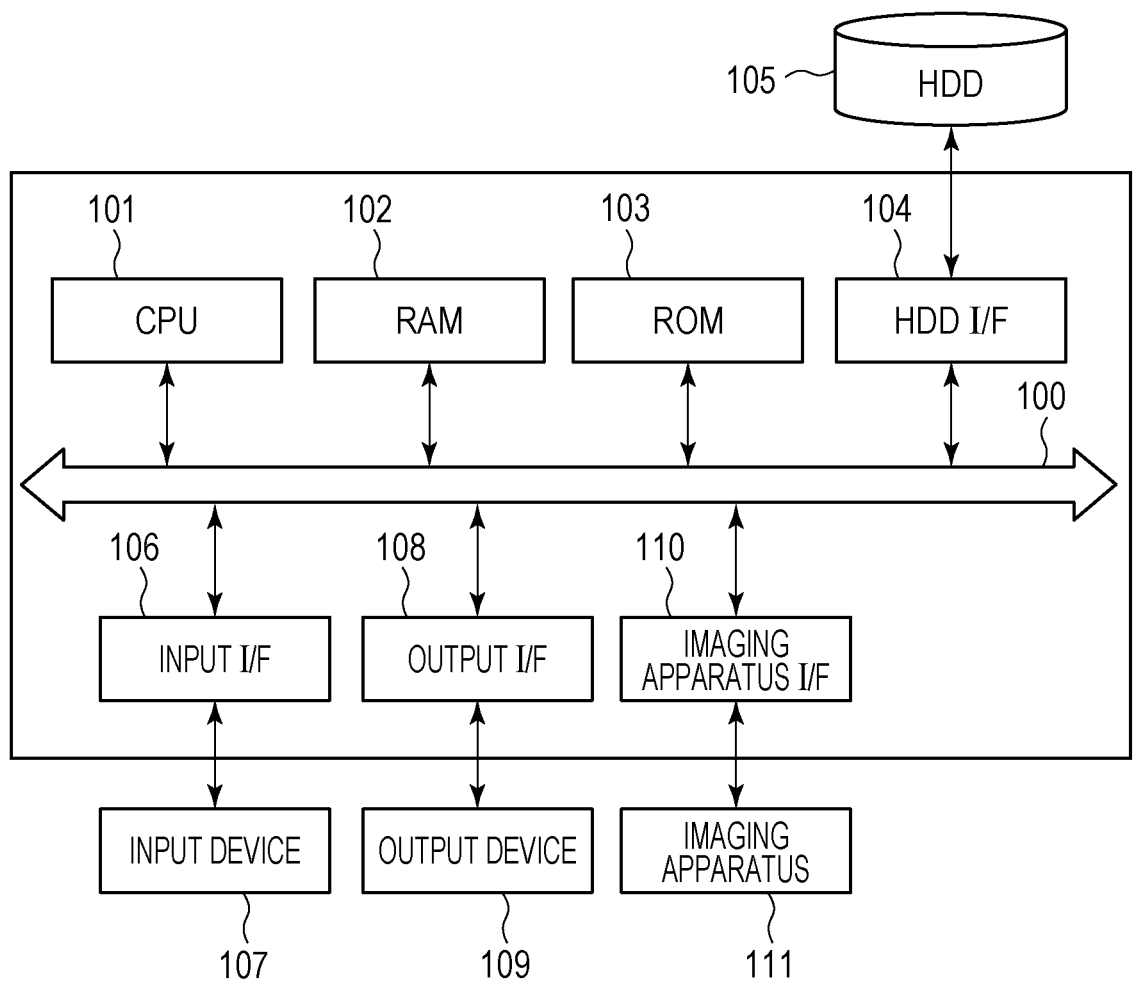
FIG. 1 is a block diagram illustrating the hardware configuration of a system that includes an image-processing apparatus.

Embodiments of the present invention will hereinafter be described with reference to the drawings. The embodiments described below do not limit the present invention. All combinations of features described according to the embodiments are not necessarily essential to solutions according to the present invention. In the description, like components are designated by like reference characters.

First Embodiment

Figure 4:
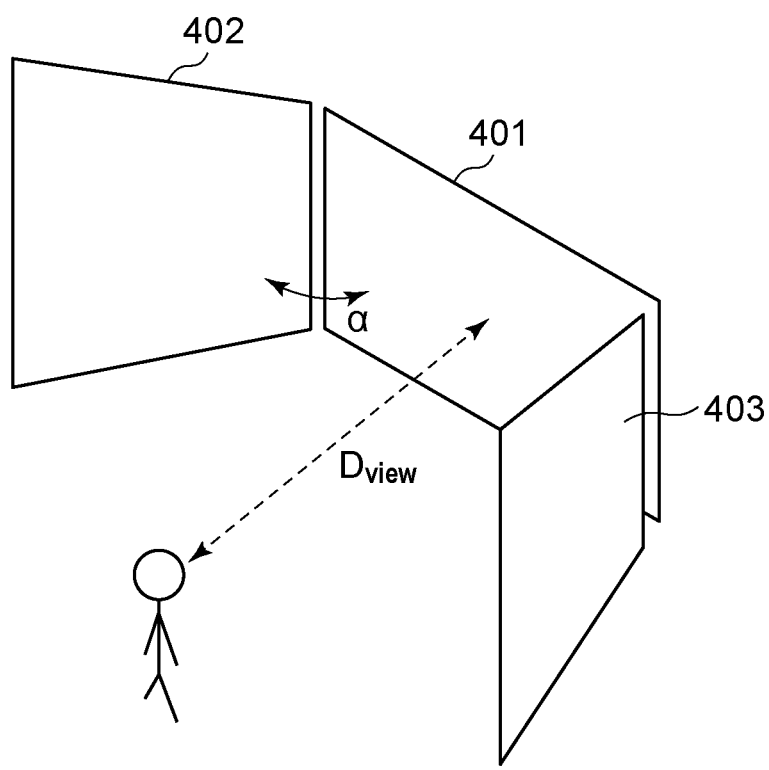
FIG. 4 illustrates an example of the structure of a display system.
Figure 8A:
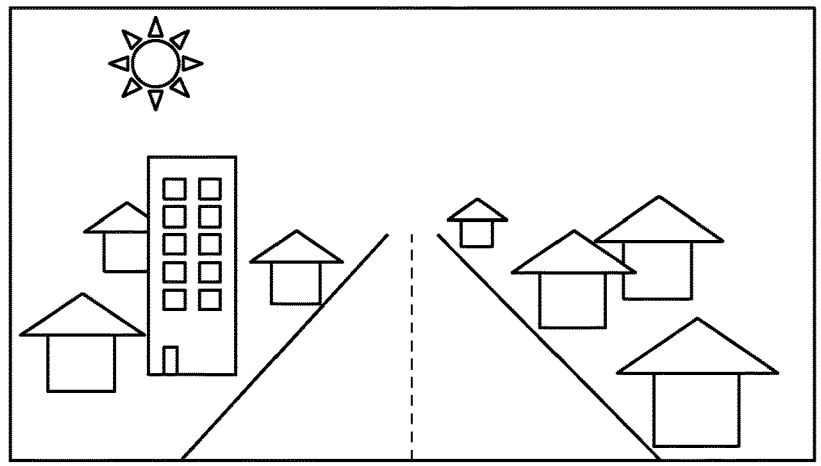
FIG. 8A illustrates an example of the image containing the marker.
Figure 8B:
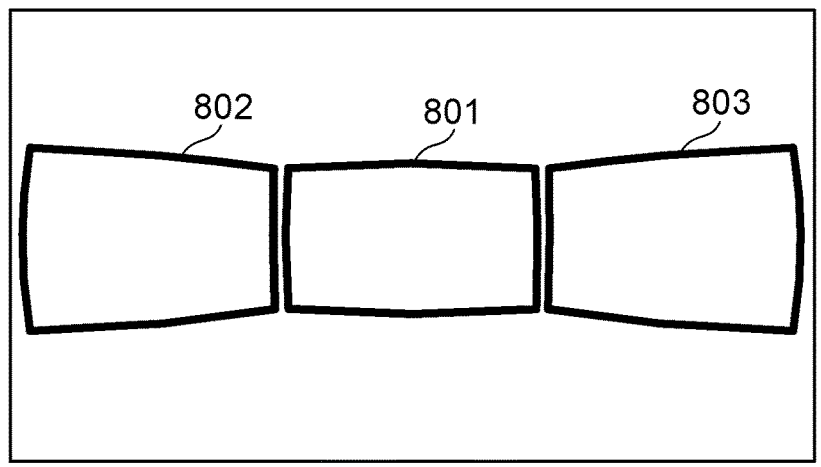
FIG. 8B illustrates an example of the image containing the marker.
Figure 15A:
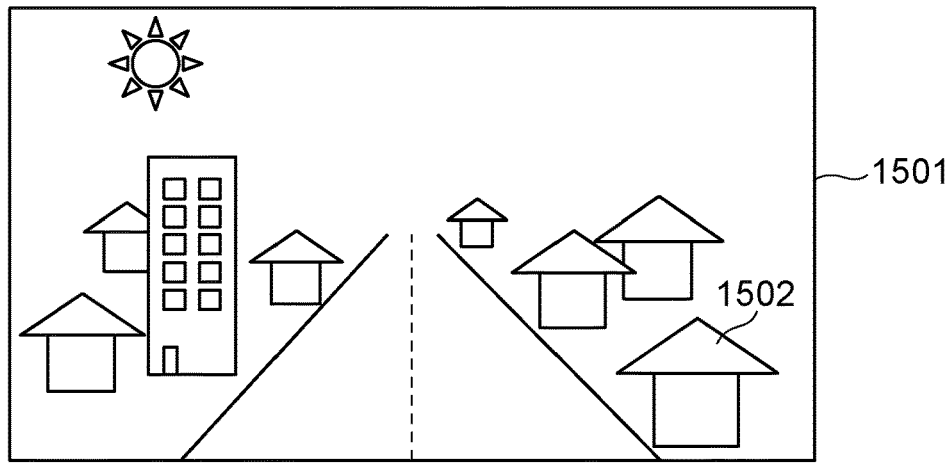
FIG. 15A illustrates a problem of a display range of a display system.
Figure 15B:
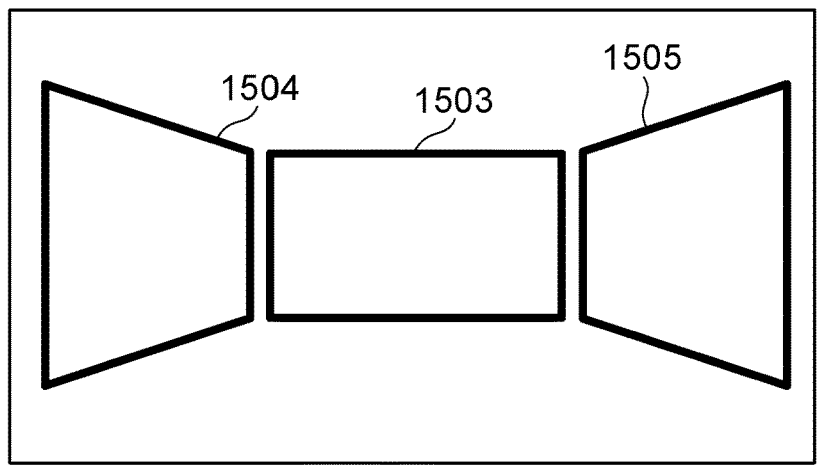
FIG. 15B illustrates the problem of the display range of the display system.

In the case where an image that is obtained by imaging is displayed by a display device that differs from an imaging apparatus, it is necessary to cut a partial image from the image in accordance with a display form of the display device. In some cases, an image in accordance with a user's intention cannot be included in the range of cutting in a cutting process, that is, the display range of the display device. For example, a case where an image is displayed by a display system illustrated in FIG. 4 is considered. The display system in FIG. 4 includes three screens and three projectors. A left-hand side screen 402 and a right-hand side screen 403 are angled at an angle α with respect to a center screen 401. In FIG. 4, the projectors are not illustrated. The three projectors are disposed right above a viewpoint position (viewer) so as to overlap and project the image on the screens. The viewpoint position is assumed to be located a distance Dview away from the center of the center screen 401 in a direction perpendicular to the center screen 401. The image is displayed by using the three screens that cover most of the field of view of the viewer. This offers the viewer image experience with a more realistic feeling from which the viewer feels as if the viewer were where the displayed image has been obtained. FIG. 15A illustrates an imaged image 1501 that contains an object 1502 to be displayed on a screen of the display system. FIG. 15B illustrates display ranges 1503 to 1505 for the partial image that is cut from an image when a partial image is displayed on the above screens. Here, attention is paid to the shapes of the display ranges. For example, if three screens having the same size are arranged side by side, the display ranges 1503 to 1505 have rectangle shapes having the same size. However, to offer image experience with a more realistic feeling as above, it is important to arrange the screens such that the screens cover the field of view of the viewer. That is, as in the display system illustrated in FIG. 4, the left-hand side screen 402 and the right-hand side screen 403 are angled with respect to the center screen 401. Depending on the arrangement of the screens, as illustrated in FIG. 15B, the shape of the display range 1503 is a rectangular shape, but the shapes of the display range 1504 and the display range 1505 are trapezoidal shapes. The shapes of the display ranges 1503 to 1505 change also depending on a projection method of a lens when the imaged image 1501 is captured. The display ranges illustrated in FIG. 15B are used in the case of a typical central projection lens. In the case of using, for example, an equidistant projection fisheye lens, as illustrated in FIG. 8B, the shapes of the display ranges are slightly rounded unlike the case of the central projection lens.

Figure 15C:
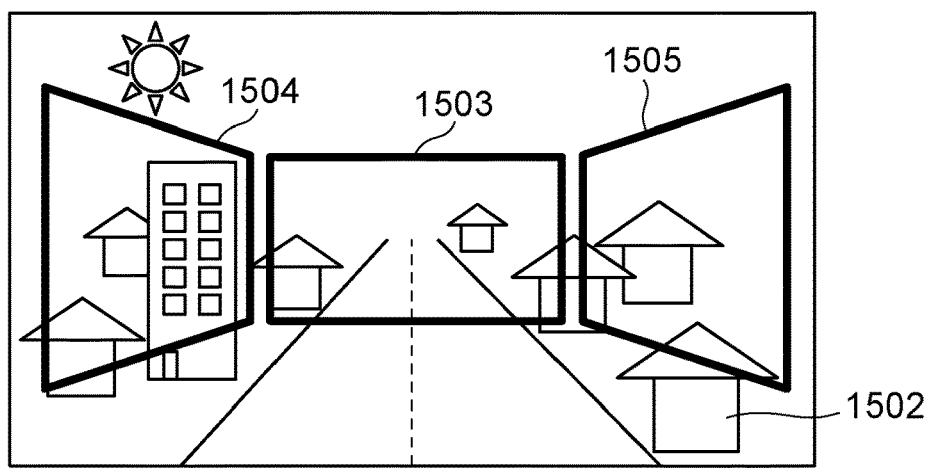
FIG. 15C illustrates the problem of the display range of the display system.

FIG. 15C illustrates the imaged image 1501 illustrated in FIG. 15A and the display ranges 1503 to 1505 of the screens illustrated in FIG. 15B that are superimposed and displayed by way of example. As illustrated in FIG. 15C, it can be seen that the entirety of the object 1502 to be displayed is not included within the display ranges of the screens. In the following description, the result that the entire object is not displayed in a display range of a screen and that a part thereof is cut off is referred to as a cut-off image. The user performs imaging while checking the display area of, for example, an electronic viewfinder (EVF) or a monitor of the imaging apparatus. Accordingly, the user can check the range of the image that is currently imaged. However, when the imaged image 1501 is displayed on a screen, the user does not know a range in which the imaged image 1501 is to be displayed on the screen. Consequently, the cut-off image occurs when a part of the imaged image 1501 is cut and displayed on the screen. The cut-off image thus occurs because the user does not recognize the range in which the imaged image 1501 is to be displayed on the screen during imaging. In view of this, according to the present embodiment, a range in which an image that is obtained by imaging is to be displayed by the display device is indicated to the user during imaging. Specifically, a marker that depends on a display form of the display device is generated, and the generated marker is superimposed on the image and displayed during imaging. This allows the user to know a range in which the display device can display the image that is obtained by imaging. In the following description, a display device or a display system that displays a part of an imaged image after imaging is referred to as a first display device or a first display system. A device that displays an image on which a marker is superimposed during imaging is referred to as a second display device. In the case where a display area of an imaging apparatus is used for the second display device, the display area is referred to as a second display area.

<Hardware Configuration of Image-Processing Apparatus 1>

An example of the hardware configuration of a system that includes an image-processing apparatus 1 will be described with reference to FIG. 1. The image-processing apparatus 1 is, for example, a computer and includes a CPU 101, a RAM 102, a ROM 103, a HDD interface (I/F) 104, an input I/F 106, an output I/F 108, and an imaging apparatus I/F 110. The CPU 101 uses the RAM 102 as a work memory to run programs that are stored in the ROM 103 and a hard disk drive (HDD) 105 and controls components via a system bus 100. The HDD I/F 104 is an interface such as serial ATA (SATA). A secondary storage device such as the HDD 105 or an optical disk drive is connected to the HDD I/F 104. The CPU 101 can read data from the HDD 105 and can write data to the HDD 105 via the HDD I/F 104. The CPU 101 can load data that is stored in the HDD 105 onto the RAM 102 and can save the data that is loaded onto the RAM 102 in the HDD 105. The CPU 101 can run a program corresponding to the data that is loaded onto the RAM 102. The input I/F 106 is a serial bus interface such as USB or IEEE 1394. An input device 107 such as a keyboard or a mouse is connected to the input I/F 106. The CPU 101 can read data from the input device 107 via the input I/F 106. The output I/F 108 is an image output interface such as DVI or HDMI (registered trademark). An output device 109 such as a liquid-crystal display is connected to the output I/F 108. The output device 109 corresponds to the second display device or the second display area described above. The CPU 101 can transmit data to the output device 109 via the output I/F 108 to perform a process such as display. The imaging apparatus I/F 110 is a serial bus interface such as USB. An imaging apparatus 111 such as a video camera is connected to the imaging apparatus I/F 110. The CPU 101 can obtain imaging data such as video frame data from the imaging apparatus 111 via the imaging apparatus I/F 110.

Figure 16:
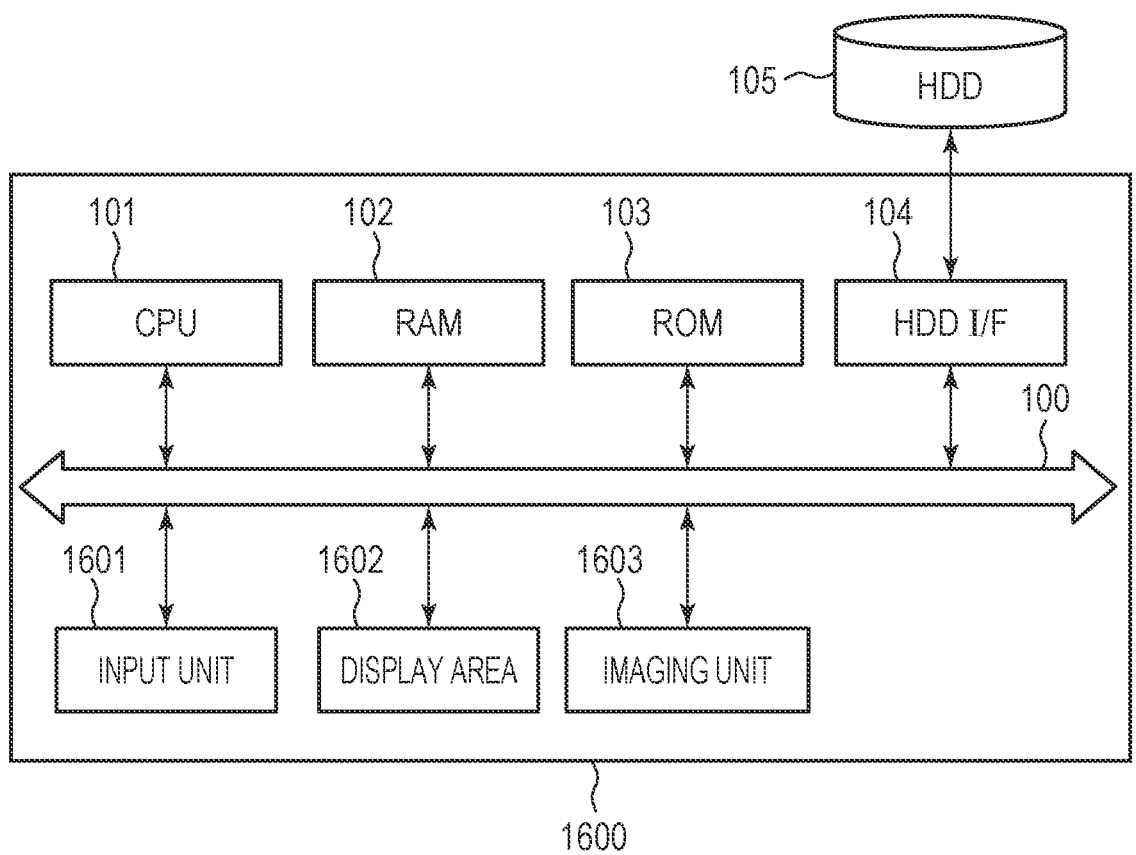
FIG. 16 is a block diagram illustrating the structure of an imaging system.

The image-processing apparatus 1 may not include the imaging apparatus I/F 110. In this case, the imaging apparatus is connected to the input I/F 106 instead of the imaging apparatus I/F 110. An imaging apparatus that includes the imaging apparatus 111 and the output device 109 as an integrated component may be connected to the imaging apparatus I/F 110. For example, a video camera that has a display area such as an EVF or a monitor can be used as the imaging apparatus 111. In this case, the CPU 101 transmits data to the display area via the imaging apparatus I/F 110 for display. The image-processing apparatus 1 may be included in the output device 109 or the imaging apparatus 111. For example, an imaging system that includes the image-processing apparatus 1, the output device 109, and the imaging apparatus 111 as an integrated component may be acceptable. FIG. 16 is a block diagram illustrating an example of an imaging system 1600. The imaging system 1600 is, for example, a digital camera and includes the CPU 101, the RAM 102, the ROM 103, the HDD interface (I/F) 104, an input unit 1601, a display area 1602, and an imaging unit 1603. The input unit 1601 is an input unit such as a button. The display area 1602 is a display area such as an EVF or a monitor. The imaging unit 1603 includes an optical system such as a lens and generates an image by using the optical system. The imaging system 1600 does not necessarily include the input unit 1601 and the display area 1602 separately but may include a touch panel display that includes the input unit 1601 and the display area 1602 as an integrated component. The imaging system is not limited to a digital camera but may be, for example, a portable information terminal such as a smart phone.

<Functional Configuration of Image-Processing Apparatus 1>

Figure 2:
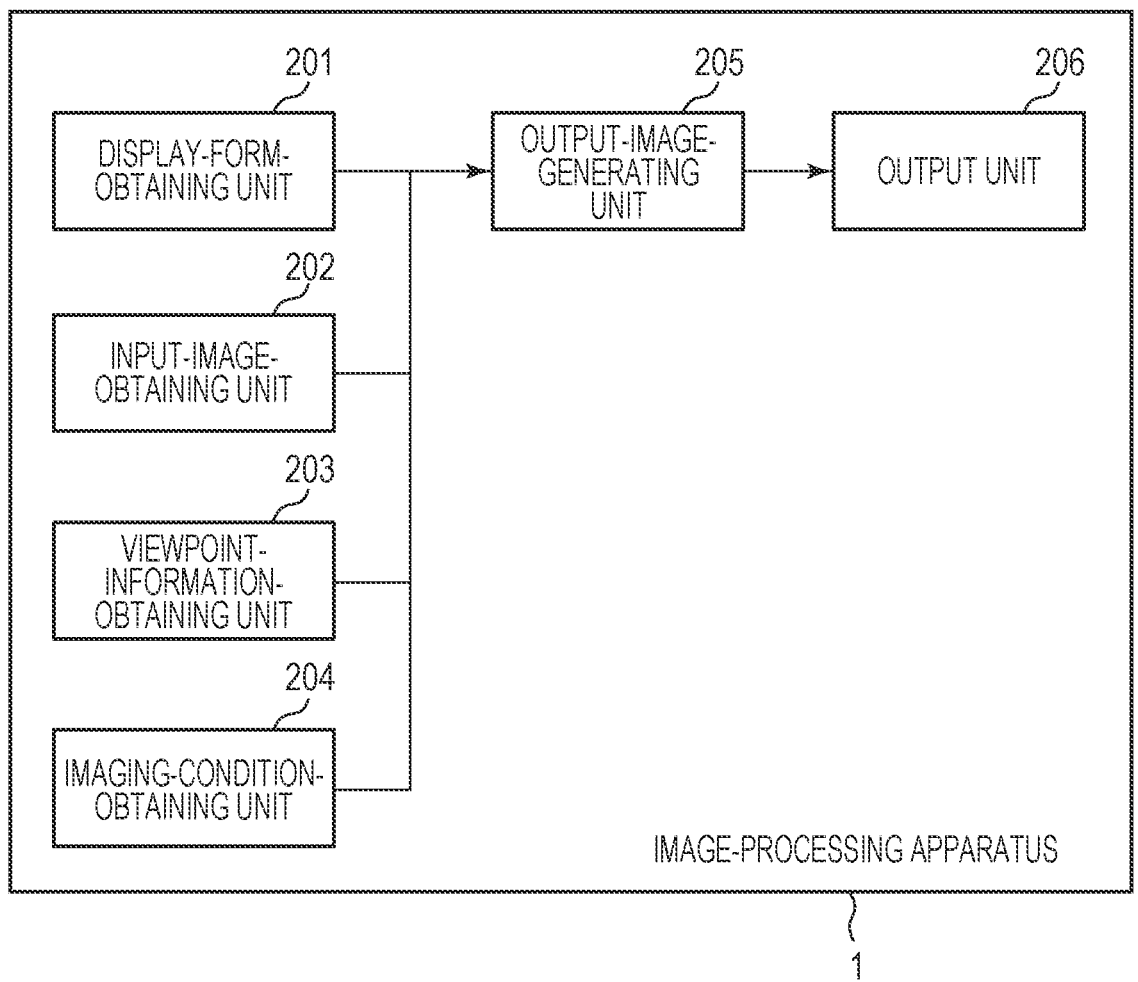
FIG. 2 is a block diagram illustrating the functional configuration of the image-processing apparatus.

The functional configuration of the image-processing apparatus 1 will be described with reference to FIG. 2. FIG. 2 is a block diagram of the functional configuration of the image-processing apparatus 1. The CPU 101, which reads a program that is stored in the ROM 103 or the HDD 105 and runs the program with the RAM 102 used as a work area, functions to achieve the functional configuration illustrated in FIG. 2. It is not necessary for the CPU 101 to perform all of processes described below. The structure of the image-processing apparatus 1 may be such that some or all of the processes are performed by one or more processing circuits other than the CPU 101.

The image-processing apparatus 1 includes a display-form-obtaining unit 201, an input-image-obtaining unit 202, a viewpoint-information-obtaining unit 203, an imaging-condition-obtaining unit 204, an output-image-generating unit 205, and an output unit 206. The display-form-obtaining unit 201 obtains display form information that represents a display form of the first display system that displays an image. The display form information on the first display system includes information about the number of screens of the first display system, the sizes of the screens, the resolution of the screens, and arrangement information that represents the positions and directions of the screens. The input-image-obtaining unit 202 obtains input image data representing an input image. The input image is an image to be displayed with a marker superimposed thereon. The viewpoint-information-obtaining unit 203 obtains viewpoint information that represents the position of a viewpoint from which the image that is displayed by the first display system is observed. The imaging-condition-obtaining unit 204 obtains imaging information that represents imaging conditions. The imaging information contains the sensor sizes of the imaging apparatus 111, the focal length of the lens, the angle of view, the projection method, and the resolution of the input image. The output-image-generating unit 205 generates image data with the marker for displaying an image containing the marker that is obtained by superimposing the marker on the input image. The image containing the marker is also referred to below as an output image. The image data with the marker is also referred to below as output image data. The output unit 206 outputs the image data with the marker to the output device 109.

<Processing Performed by Image-Processing Apparatus 1>

Figure 3:
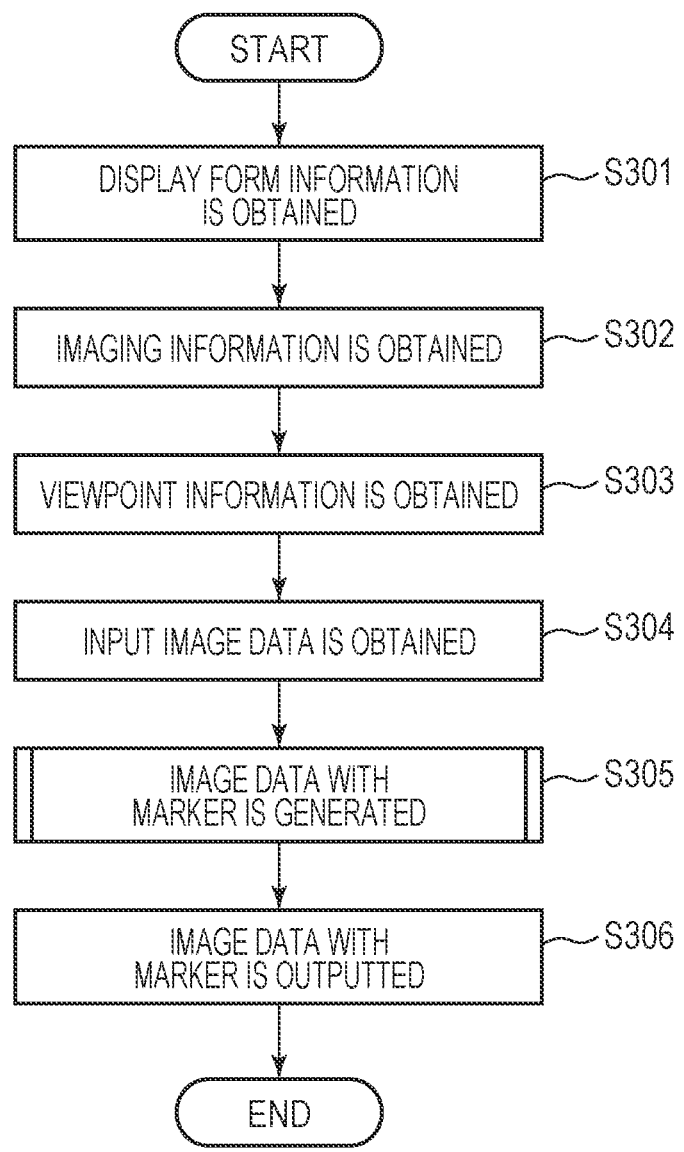
FIG. 3 is a flowchart illustrating the flow of processing that is performed by the image-processing apparatus.

FIG. 3 is a flowchart illustrating the flow of processing that is performed by the image-processing apparatus 1. In the following description, steps (processes) will be described by S at the beginning of characters.

At S301, the display-form-obtaining unit 201 obtains the display form information that represents the display form of the first display system that displays the image. The process at S301 is performed based on a user instruction by using the input device 107. According to the present embodiment, the display form information is obtained by selecting information from pieces of the display form information stored in the HDD 105 in advance, based on the user instruction. The first display system according to the present embodiment is the display system illustrated in FIG. 4. The first display system includes the three screens and the three projectors. The left-hand side screen 402 and the right-hand side screen 403 are angled at the angle α with respect to the center screen 401. The sizes of the screens are represented by a width $W_{mm}$ and a height $H_{mm}$. The three screens have the same size. The projectors are arranged in conditions in which an image having resolution of $W_{pix} \times H_{pix}$ is displayed on the screens and used to project the image on the screens. In FIG. 4, the projectors are not illustrated. The three projectors according to the present embodiment are arranged right above the viewpoint position so as to overlap and project the image on the screens. The position of the image that is projected on the projectors is adjusted by a lens shift function or a keystone correction function that the projectors have. Regarding the display form information, the number of the screens is 3, the sizes of the screens are represented by the width $W_{mm}$ and the height $H_{mm}$, and the resolution of the screens is represented by $W_{pix} \times H_{pix}$. Information about the arrangement of each screen represents a normal vector N that represents the direction of a normal to a surface of the screen and the position (x, y, z) of the center of the screen in a three-dimensional XYZ coordinate system. The normal is a normal to a surface facing the viewpoint from which the screens are observed. The origin of the XYZ coordinate system coincides with a viewpoint position that is represented by the viewpoint information. An image that is cut from the single input image is displayed on the screens that are arranged in the above manner. This offers the viewer the image having a wider field of view than that in the case where the image is displayed by using a single screen. Images that are irrelevant to each other are not displayed on the screens, but a single combined image is displayed on the screens. Accordingly, the displayed image has a field of view similar to that of the viewer. The above structure is an example. The number, the sizes, and arrangement of the screens are not limited thereto. The resolution of the screens described above may not mean the resolution of the image on the screens but may mean the resolution of the projectors that project the image on the screens.

At S302, the imaging-condition-obtaining unit 204 obtains the imaging information that represents the imaging conditions. A process at S302 is performed based on the user instruction by using the input device 107. According to the present embodiment, the imaging information is obtained by selecting items one by one from the imaging conditions that are stored in the HDD 105 in advance, based on the user instruction. Regarding the imaging information, the sensor sizes of the imaging apparatus 111 are represented by a width $SW_{mm}$ and a height $SH_{mm}$, the focal length of the lens is represented by f, the angle of view is represented by $\theta_{max}$, the resolution of the input image is represented by $SW_{pix} \times SH_{pix}$. The lens of the imaging apparatus 111 according to the present embodiment is an equidistant projection fisheye lens, and the projection method is equidistant projection.

At S303, the viewpoint-information-obtaining unit 203 obtains the viewpoint information that represents the position of the viewpoint from which the image that is displayed by the first display system is observed. A process at S303 is performed based on the user instruction by using the input device 107. According to the present embodiment, the viewpoint information is obtained by selecting information from the viewpoint information that represents the position of the viewpoint that is stored in the HDD 105 in advance, based on the user instruction. The viewpoint information represents the position (0, 0, 0) of the viewpoint in the above XYZ coordinate system. In the description according to the present embodiment, as illustrated in FIG. 4, the viewpoint is assumed to be located the distance Dview away from the center of the center screen 401 in the direction perpendicular to the center screen 401. The viewpoint position is not limited to the example described above.

At S304, the input-image-obtaining unit 202 obtains the input image data that is obtained by using the imaging apparatus 111. Specifically, the input image data is obtained into the RAM 102 via the imaging apparatus I/F 110. According to the present embodiment, the imaging apparatus 111 is a video camera, and image data corresponding to each frame of a video is used as the input image data to performed the following process.

At S305, the output-image-generating unit 205 generates the image data with the marker for displaying the image containing the marker that is obtained by superimposing the marker that represents the range of cutting in the cutting process, that is, the display range of the first display system. Specifically, the image data with the marker is generated by superimposing marker image data that is generated in the present step on the input image data that is obtained at S304. A process at the present step will be described in detail later. At S306, the output unit 206 outputs the image data with the marker that is generated at S305 to the output device 109 via the output I/F 108.

<Processing of Generating Image Data Containing Marker (S305)>

Figure 5:
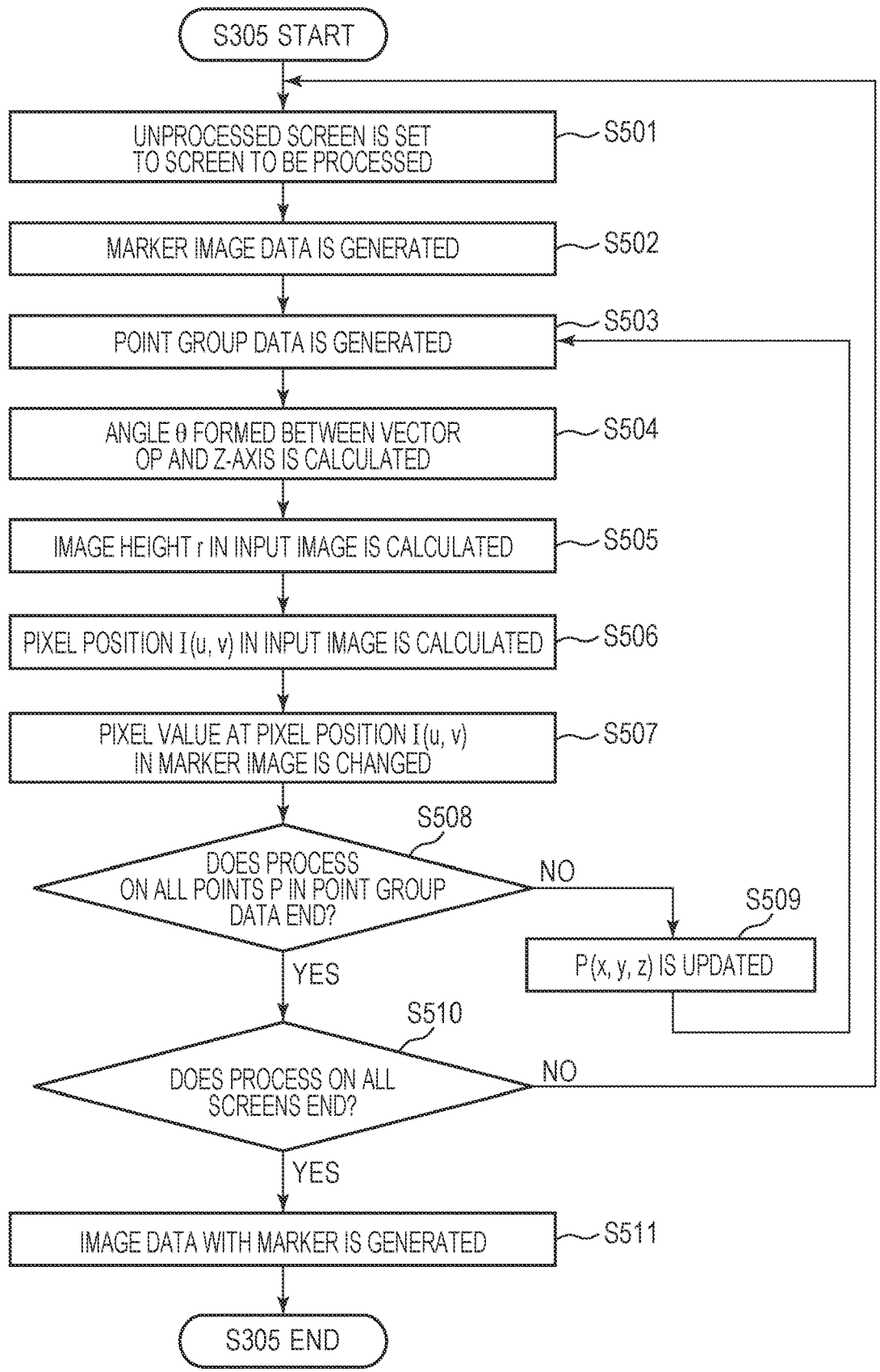
FIG. 5 is a flowchart illustrating the flow of processing of generating an image containing a marker.

FIG. 5 is a flowchart illustrating processing of generating the image data with the marker at S305 in detail. In the process at S305, cutting ranges relative to the screens in the input image are successively calculated to display the image on the three screens that are included in the first display system illustrated in FIG. 4. The image data with the marker is generated by using the calculated cutting ranges as the marker image data and superimposing the cutting ranges on the input image data. A display image that is obtained by being cut from the input image is displayed on the screens. The steps in the flowchart will now be described.

At S501, the output-image-generating unit 205 sets a screen for which processes at S502 to S509 are not processed to a screen to be processed. According to the present embodiment, the three screens illustrated in FIG. 4 are successively set to the screens to be processed in the present step. At S502, the output-image-generating unit 205 generates the marker image data having the same resolution as that of the input image data in the RAM 102, based on the resolution of the input image, and all pixel values are initialized with white. The marker image data according to the present embodiment is binary data the pixel value of which can be 0 (white) or 1 (black). Provided that the position of the marker can be identified, multi-value data the pixel value of which is expressed in 8 bits or 16 bits is also acceptable.

Figure 17A:
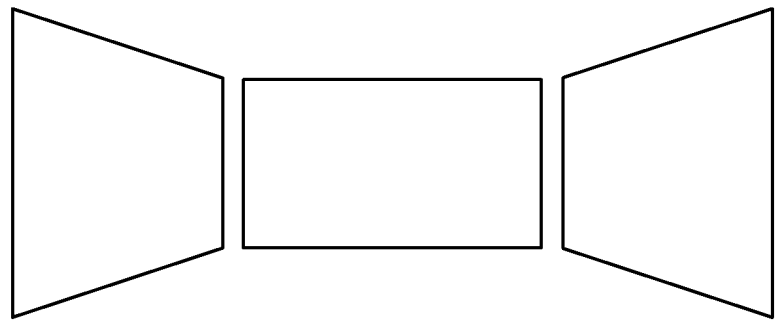
FIG. 17A illustrates the positions of the edges of image display regions of screens.
Figure 17B:
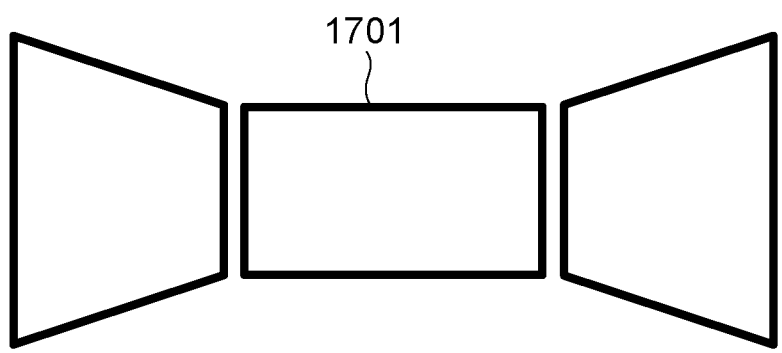
FIG. 17B illustrates the positions of the edges of the image display regions of the screens.
Figure 17C:
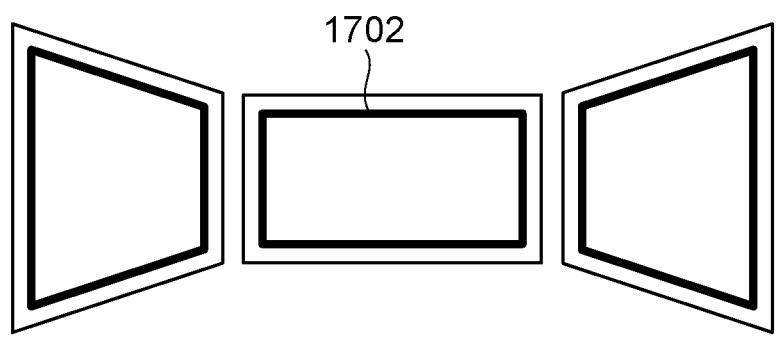
FIG. 17C illustrates the positions of the edges of the image display regions of the screens.

At S503, the output-image-generating unit 205 identifies a position relative to an edge portion of an image display region of each screen at a predetermined interval, based on the information about the arrangement of each screen and a screen size, and calculates three-dimensional coordinates of each position P. The output-image-generating unit 205 generates the three-dimensional coordinates (x, y, z) of each position P as point group data. The origin of the three-dimensional coordinates that are used herein coincides with the viewpoint position from which the screens are observed. As the interval for the point P of the point group data decreases, the accuracy of the shape of the marker increases. However, a processing time increases accordingly. For this reason, the interval for the point may be set depending on the required accuracy of the shape of the marker and the processing time. According to the present embodiment, the interval for the point P is determined based on the resolution of the screens. According to the present embodiment, the sizes of the screens are represented by the width $W_{mm}$ and the height $H_{mm}$, and the resolution of the screens is represented by $W_{pix} \times H_{pix}$. Accordingly, the three-dimensional coordinates of the center point of each pixel on the screens are calculated based on these. Among the three-dimensional coordinates of the center point of each pixel, all of the three-dimensional coordinates of the pixels corresponding to the edge portion of the image display region are contained in the point group data to be processed. FIGS. 17A-17C illustrate the positions of the edges of the image display regions of the screens. FIG. 17A illustrates the three screens illustrated in FIG. 4 that are observed from the viewpoint position in front of the center screen 401. According to the present embodiment, the whole of the screens is used as the image display regions described above. Accordingly, the positions of the edges of the image display regions of the screens are illustrated by thick lines 1701 in FIG. 17B. The whole of the screens is not necessarily used as the image display regions. For example, as illustrated by thick lines 1702 in FIG. 17C, the edges of the image display regions may be located inside the edges of the screens. In the case where the image is displayed as illustrated in FIG. 17C, the output-image-generating unit 205 generates the point group data, based on the information about the arrangement of each screen and information that enables the sizes of the image display regions of the screens to be calculated. For example, regarding the information that enables the sizes of the image display regions of the screens to be calculated, the sizes of the image display regions may be additionally obtained as the display form information.

At S504, the output-image-generating unit 205 extracts the point P (x, y, z) from the point group data and calculates an angle θ that is formed between a vector OP and a Z-axis in the case where the viewpoint position is the origin O by using expression (1), regarding the extracted point P.

$$\theta = \cos^{-1}\left(\frac{z}{\sqrt{x^2 + y^2 + z^2}}\right) \qquad \text{[Math. 1]}$$

Figure 6A:
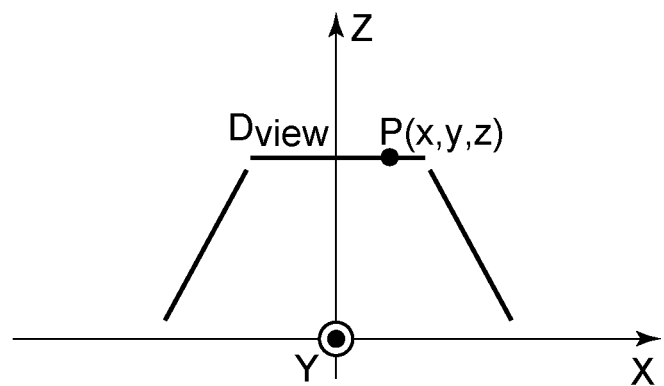
FIG. 6A illustrates a three-dimensional spatial coordinate system.
Figure 6B:
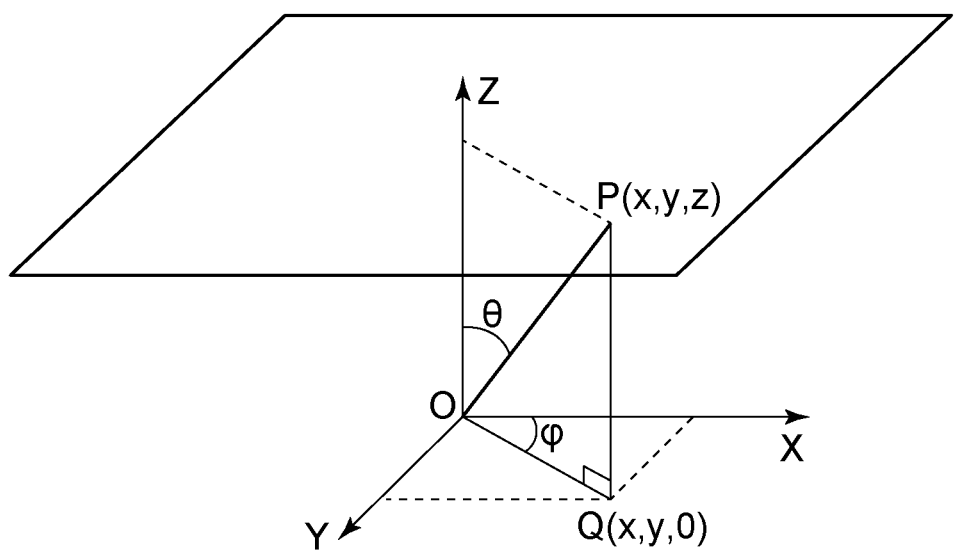
FIG. 6B illustrates the three-dimensional spatial coordinate system.

The three-dimensional spatial coordinate system according to the present embodiment will be described with reference to FIGS. 6A-6B. FIG. 6A illustrates a positional relationship among the three screens in the three-dimensional coordinates the origin of which coincides with the viewpoint position. The point P (x, y, z) represents the three-dimensional coordinates of a point on the screen to be processed. FIG. 6B illustrates FIG. 6A viewed at a different angle. The angle that is formed between the vector OP and the Z-axis is defined as θ. The foot of a perpendicular that extends from the point P to an XY plane is defined as a point Q (x, y, 0). An angle that is formed between a vector OQ and an X-axis is defined as φ.

At S505, the output-image-generating unit 205 calculates an image height r in the input image at a point I by using expression (2), where I (u, v) is a point corresponding to the point P (x, y, z) in the input image. According to the present embodiment, the input image is obtained at an angle $\theta_{max}$ of view by using the equidistant projection fisheye lens, and the image height r can be expressed as a ratio between θ and $\theta_{max}$.

$$r = \frac{\theta}{\theta_{max}} \qquad \text{[Math. 2]}$$

Figure 7:
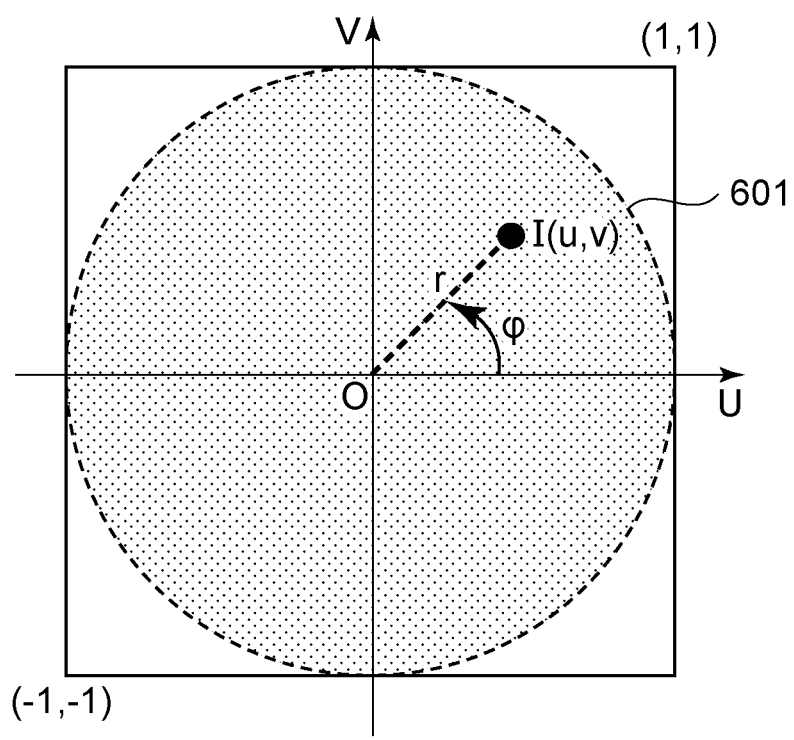
FIG. 7 illustrates a two-dimensional UV coordinate system.

FIG. 7 illustrates the point I (u, v) on the input image in a two-dimensional UV coordinate system. The center of the input image coincides with the origin. Normalization is carried out such that coordinates on the lower left of the image are (−1, −1), and coordinates on the upper right are (1, 1). An angle φ that is formed between the vector OI and a U-axis is equal to φ illustrated in FIG. 6B. The lens used according to the present embodiment is a fisheye lens, and a range in which the image is actually displayed is within a region in an image circle 601 illustrated in FIG. 6B.

At S506, the output-image-generating unit 205 calculates the coordinates (u, v) of the point I on the input image by using expression (3) and expression (4).

$$u = r\cos\varphi = \frac{x}{\sqrt{x^2 + y^2}} r \qquad \text{[Math. 3]}$$

$$v = r\sin\varphi = \frac{x}{\sqrt{x^2 + y^2}} r \qquad \text{[Math. 4]}$$

At S507, the output-image-generating unit 205 changes a pixel value relative to the coordinates (u, v) that are calculated at S506 in the marker image data into black. That is, the pixel value is converted from 0 (white) to 1 (black). Specifically, the values of (u, v) are decimal numerals ranging between −1.0 and 1.0, and normalization is carried out such that the values of (u, v) range from 0 to 1.0 by adding 1 to u and v and dividing these by 2. In addition, u is multiplied by the width $SW_{pix}$ of a marker image, and v is multiplied by the height $SH_{pix}$ to calculate information that represents the positions of the pixels on the marker image. Among 4 pixels near (u, v), the nearest pixel is processed such that the pixel value is changed into black. In the case where the marker image data is multi-value data, the colors of the pixels may be determined by weighting the 4 pixels near thereto by a distance. At S508, the output-image-generating unit 205 determines whether the process on all of the points P of the point group data relative to the screen to be processes ends. If the process on all of the points P ends, a process at S510 is performed. If the process on all of the points P does not end, the flow returns to the process at S509.

At S509, the output-image-generating unit 205 updates the coordinates of the point P by using a point in the point group data the process of which does not end, and the flow returns to the process at S504. At S510, the output-image-generating unit 205 determines whether all of the screens that are included in the first display system have been set to the screens to be processed. According to the present embodiment, whether all of the three screens of the center screen 401, the left-hand side screen 402, and the right-hand side screen 403 have been set to the screens to be processed is determined. If all of the screens have been set to the screens to be processed, a process at S511 is performed. If all of the screens have not been set to the screens to be processed, the flow returns to the process at S501.

Figure 8C:
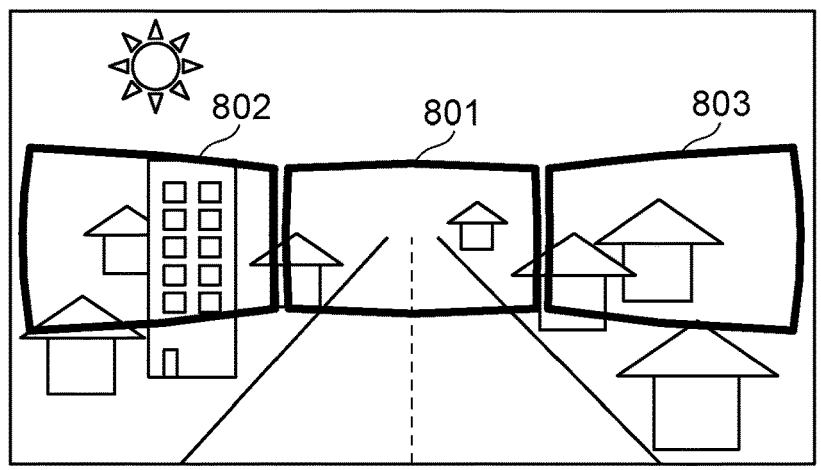
FIG. 8C illustrates an example of the image containing the marker.
Figure 9A:
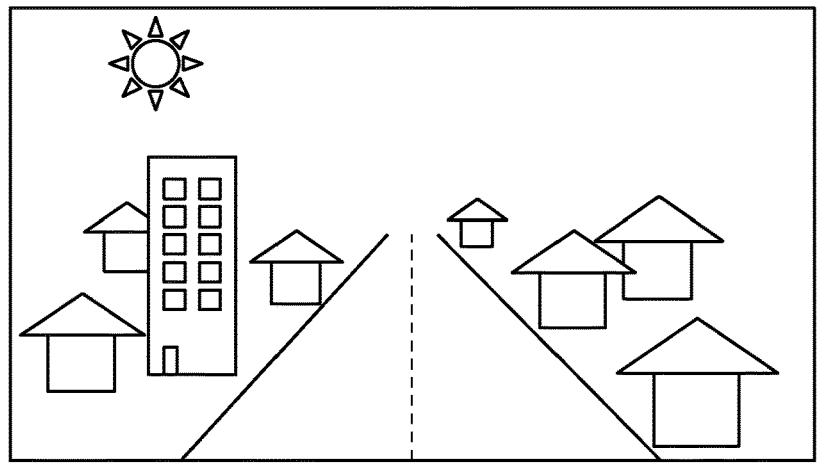
FIG. 9A illustrates an example of the image containing the marker.
Figure 9B:
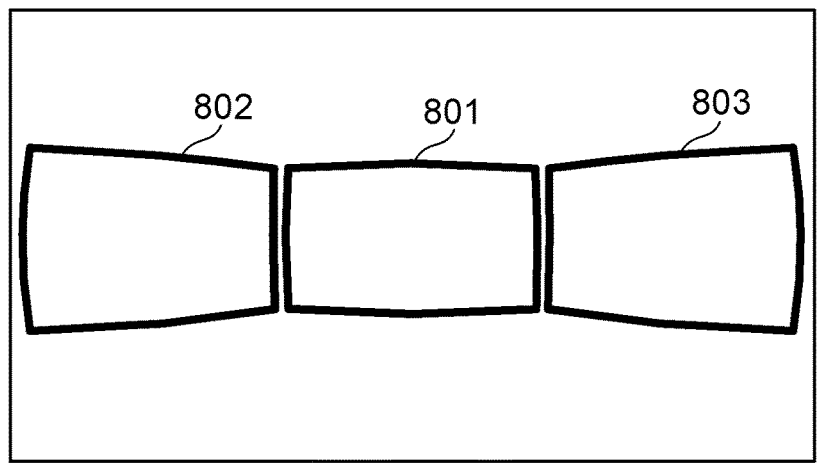
FIG. 9B illustrates an example of the image containing the marker.
Figure 9C:
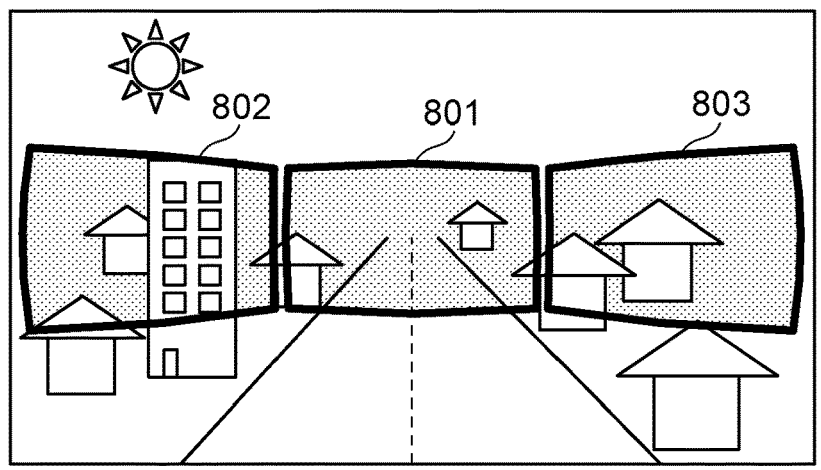
FIG. 9C illustrates an example of the image containing the marker.

At S511, the output-image-generating unit 205 performs a process of superimposing the marker image data on the input image data. Specifically, the pixel value at a pixel position in the input image relative to a black pixel in the marker image is converted to a pixel value that represents predetermined marker color. FIG. 8A illustrates the input image. FIG. 8B illustrates the marker image. FIG. 8C illustrates the image containing the marker. In this example, a frame that represents the cutting range relative to each screen is added as the marker. The marker may not be the frame that represents the cutting range relative to each screen. For example, as in an example illustrated in FIGS. 9A-9C, the marker may be a region in which color or luminance in the cutting range, for example, is changed. In this case, for example, the color or luminance in the cutting range is changed by adding a predetermined pixel value to the pixel value in the cutting range. FIG. 9A illustrates the input image. FIG. 9B illustrates the marker image. FIG. 9C illustrates the image containing the marker. The cutting range may be specified by performing a process on each pixel outside the region that is represented by the marker, for example, by decreasing the luminance of each pixel outside a rectangle that is represented by the marker. In this case, for example, the color or luminance outside the cutting range is changed by subtracting a predetermined pixel value from the pixel value outside the cutting range. The color or luminance outside the cutting range may be changed by converting the pixel value outside the cutting range into a predetermined pixel value.

Effects According to First Embodiment

The image-processing apparatus according to the present embodiment obtains the information that represents the display form of the device or the system that includes the display area and the input image data representing the input image as described above. The range in which the input image is displayed in the display area is identified, based on the input image data and the information that represents the display form, and the information that represents the identified range is outputted. The shape of the identified range depends on the display area that corresponds to at least the curved screen or the flat screens. This provides information for generating the marker that is suitable for the display device that displays a part of the image that is obtained by imaging. The marker that is generated in the above manner enables the user to recognize the display range of the display device during imaging.

Second Embodiment

According to the first embodiment, the marker image is generated, and the image containing the marker is generated by superimposing the generated marker image on the input image. According to the present embodiment, a table in which the display form information on the first display system and the marker image have a one-to-one relationship is generated in advance and stored, and the image containing the marker is generated by referring the table, and this method will be described. The hardware configuration of the system that includes the image-processing apparatus 1 according to the present embodiment and the functional configuration of the image-processing apparatus 1 are the same as those according to the first embodiment, and a description thereof is omitted. Differences between the present embodiment and the first embodiment will be mainly described below.

<Processes Performed by Image-Processing Apparatus 1>

Figure 10:
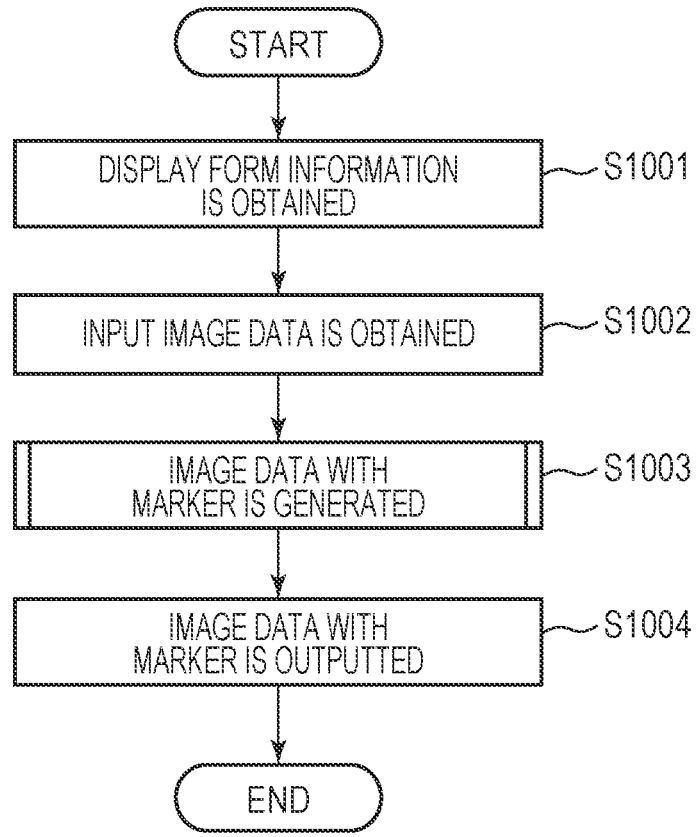
FIG. 10 is a flowchart illustrating the flow of processing that is performed by the image-processing apparatus.

FIG. 10 is a flowchart illustrating the flow of processing that is performed by the image-processing apparatus 1.

At S1001, the display-form-obtaining unit 201 obtains the display form information. The detail of the process is the same as that at S301 in FIG. 3, and a description thereof is omitted. At S1002, the input-image-obtaining unit 202 obtains the input image data. The detail of the process is the same as that at S302 in FIG. 3, and a description thereof is omitted. At S1003, the output-image-generating unit 205 generates the image data with the marker for displaying the image containing the marker that is obtained by superimposing the marker that represents the range of cutting in the cutting process, that is, the display range of the first display system. The detail of the process at S1003 will be described later. At S1004, the output unit 206 outputs the image data with the marker that is generated at S1003 to the output device 109 via the output I/F 108.

<Processing of Generating Image Data Containing Marker>

Figure 11:
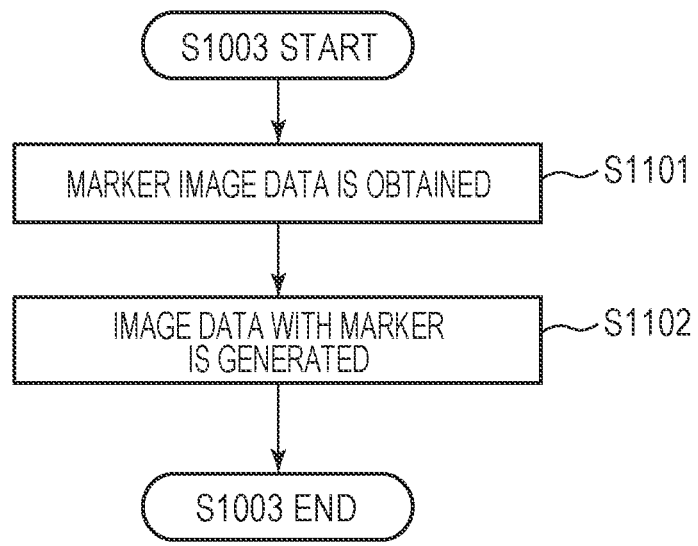
FIG. 11 is a flowchart illustrating the flow of processing of generating the image containing the marker.

The detail of processing of generating the image data with the marker according to the present embodiment will now be described with reference to a flowchart in FIG. 11.

At S1101, the output-image-generating unit 205 obtains the target marker image data from the marker image data that is stored in the HDD 105 in advance and loads the marker image data onto the RAM 102, based on the display form information that is obtained by the display-form-obtaining unit 201. Specifically, the marker image data is obtained by referring to the table that stores the relationship between the display form information on the first display system and the marker image. The table stores the relationship between the display form information on the first display system and the marker image in specific conditions including the viewpoint position and the angle of view during imaging. To deal with a condition in which the viewpoint position is frequently changed, a table in which the marker image is associated with a combination of the display form information on the first display system and the viewpoint position may be used. To deal with a change in the angle of view, the tables may be switched depending on the angle of view. The marker image data is generated by the method described according to the first embodiment and saved in the HDD 105. At S1102, the output-image-generating unit 205 performs a process of superimposing the marker image data on the input image data. The detail of the process is the same as that at S511 in FIG. 5, and a description thereof is omitted.

Effects According to Second Embodiment

The image-processing apparatus according to the present embodiment obtains the marker image data by referring to the table that stores the relationship between the display form information on the display device and the marker image, as described above. The image data with the marker is generated by superimposing the obtained marker image data on the input image data. This provides the information for generating the marker that is suitable for the display device that displays a part of the image that is obtained by imaging. The marker that is generated in the above manner enables the user to recognize the display range of the display device during imaging. In addition, the image data with the marker depending on the display form of the display device can be generated by referring to the table, that is, a relatively fast process.

Modification

According to the above embodiments, the marker image data is generated. However, this is not necessarily generated. For example, the coordinates of the frame that represents the cutting range relative to each screen may be calculated and held as the marker, and the image data with the marker may be generated by drawing the marker on the input image, based on the coordinates.

An example described according to the above embodiments, the marker is generated during imaging, and the image containing the marker is displayed by the second display device. However, timing with which the marker is generated and displayed is not limited to timing during imaging. For example, before imaging, the marker may be generated and displayed, and the user may be notified of the display range of the first display system. In this case, the marker may be continuously generated and displayed during imaging and after imaging, or the marker may not be generated and displayed during imaging and after imaging. After imaging, the marker may be generated with the imaged image that is obtained by imaging used as the above input image and may be displayed by the second display device. In this case, the user can check whether the object to be displayed is within the display range of the first display system in the input image.

According to the above embodiments, the marker is generated during imaging, and the image containing the marker is displayed by the second display device. However, how to use the image containing the marker is not limited to the above example. For example, when the imaged image is stored as a file in the HDD 105, the marker image that is generated during imaging may be associated with the imaged image and these may be stored together as a file. An associating method may be any method. For example, the association can be formed by naming the file such that the association between the imaged image and the marker image can be uniquely identified. The association enables the imaged image to be edited after imaging while the marker image is viewed. That is, an editing work can be carried out while a region of the imaged image within the display range of the first display system is checked. This enables the editing work to be more efficiently carried out by determining only a region within the display range to be a region to be edited. Information about the coordinates of the frame that represents the cutting range relative to each screen may be associated with the imaged image and stored as the marker in the HDD 105 instead of storing the marker image itself in the HDD 105. For example, the association can be formed by storing the information about the coordinates in a metadata region added to the imaged image. Alternatively, the information about the coordinates may be stored in a file that has a name that enables the association between the imaged image and the information about the coordinates to be uniquely identified and that differs from a file for the imaged image. The information about the coordinates is not limited to information about the whole of the cutting range, but only the coordinates of a corner of the frame that represents the cutting range may be stored as the information about the coordinates. In the case where the cutting range has a simple shape such as a rectangular shape, information about the coordinates of the center of the rectangular shape and the width and height of the rectangular shape may be stored as the information about the coordinates.

According to the above embodiments, the output-image-generating unit 205 generates the marker image data having the same resolution as that of the input image data, based on the resolution of the input image. However, the process of generating the marker image data is not limited to the above example. For example, at S502, the marker image data having predetermined resolution may be generated, and the resolution may be adjusted by resolution conversion when the marker image data is superimposed on the input image data at S511.

According to the above embodiments, the output-image-generating unit 205 determines the interval for the point P, based on the resolution of the screens. However, the interval may be determined based on the resolution of the input image. Whether the interval for the point P is sufficient to form the marker may be determined, and if it is determined that the interval is insufficient, the interval for the point P can be decreased. The marker may be inhibited from being discontinuous by interpolating a point in a gap after the marker image data or the image data with the marker is generated.

According to the above embodiments, the imaging apparatus 111 is a video camera. However, the imaging apparatus may be a still camera. In the case where a still image is obtained by a video camera or a still camera, the user can know the display range of the first display system before imaging.

According to the above embodiments, the three projectors are arranged right above the viewpoint position. However, the arrangement is not limited to the above example, provided that the image can be projected on the screens. For example, the image may be projected from the rear of the screens with respect to the viewpoint position by using transparent screens as the screens. The image may be projected on the three screens by using a single projector.

According to the above embodiments, the first display system includes the screens and the projectors. However, the first display system may be a display. The first display system may include a printer and a recording medium. In this case, it may be assumed that the recording medium is placed instead of the above screens, and a marker that represents a print range in the input image may be generated depending on the arrangement of the recording medium.

According to the above embodiments, the display-form-obtaining unit 201 obtains the number of the screens of the first display system, the sizes of the screens, the resolution of the screens, and the arrangement information that represents the positions and directions of the screens as the display form information. However, it is not necessary to obtain the information about all of these, provided that the information includes information for identifying the positions on the above screens corresponding to those of the edge portions of the image display regions. For example, it is not necessary to obtain the number of the screens, the sizes of the screens, and the resolution of the screens, provided that all of the coordinates of the positions in the three-dimensional space corresponding to those of the screens are obtained. The above point group data may be generated in advance and obtained as position information that represents the positions on the screens corresponding to those of the edge portions of the image display regions.

According to the first embodiment, the imaging-condition-obtaining unit 204 obtains the sensor sizes of the imaging apparatus 111, the focal length of the lens, the angle of view, the projection method, and the resolution of the input image as the imaging information. However, the angle of view can be calculated by using the sensor sizes of the imaging apparatus 111 and the focal length of the lens, and it suffices that both of the sensor sizes of the imaging apparatus 111 and the focal length of the lens are obtained, or the angle of view is obtained.

Figure 12A:
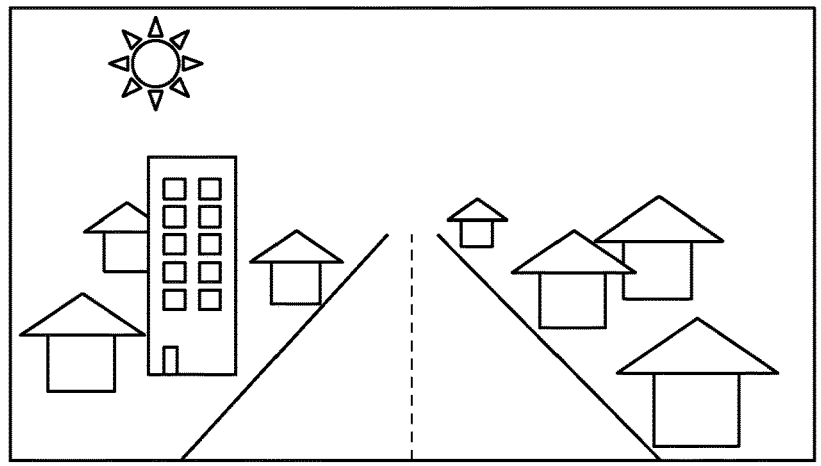
FIG. 12A illustrates an example of the image containing the marker.
Figure 12B:
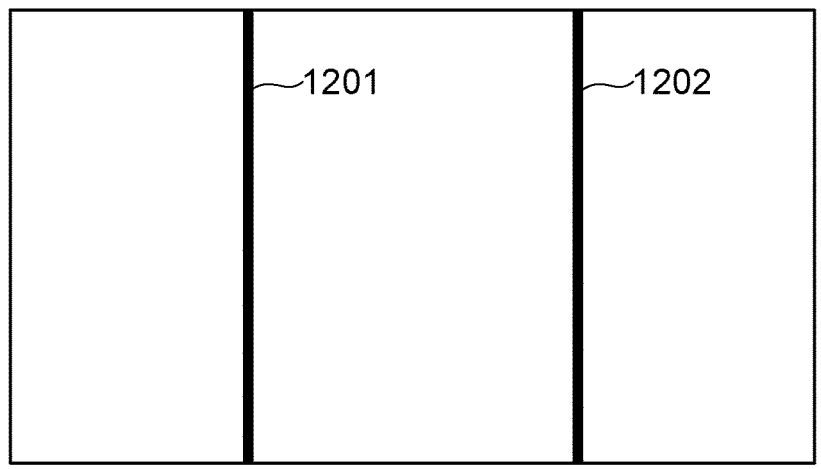
FIG. 12B illustrates an example of the image containing the marker.
Figure 12C:
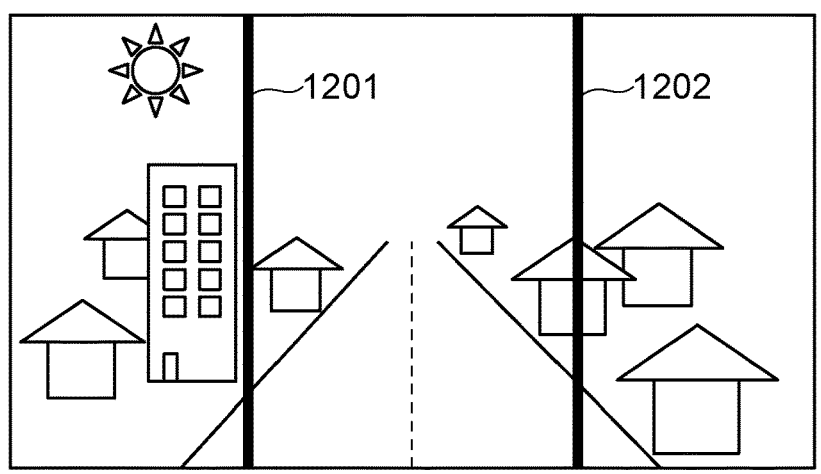
FIG. 12C illustrates an example of the image containing the marker.

In an example described according to the above embodiments, the frame that represents the cutting range relative to each screen is superimposed on the input image as the marker. However, it is not necessary for the marker to be the frame that represents the range. For example, a line marker that represents the position of the boundary between the screens. FIGS. 12A-12C illustrate an example in which the marker that represents the position of the boundary is superimposed on the input image. FIG. 12A illustrates the input image. FIG. 12B illustrates the marker image. FIG. 12C illustrates the image containing the marker. The marker in this example includes a two-lines marker of a line 1201 that represents the position of the boundary between the center screen 401 and the left-hand side screen 402 and a line 1202 that represents the position of the boundary between the center screen 401 and the right-hand side screen 403. Which object is displayed on any one of the screens can be known by checking the image that is obtained by superimposing the marker on the input image during imaging. Accordingly, the user can perform imaging while a main object is prevented from overlapping the boundary between the screens.

Figure 13:
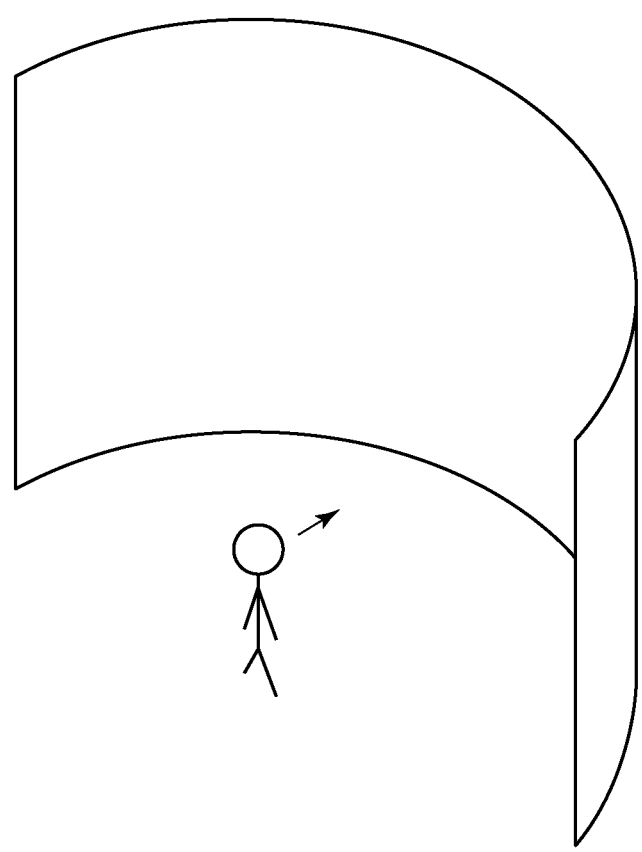
FIG. 13 illustrates an example of the structure of a display system.
Figure 14A:
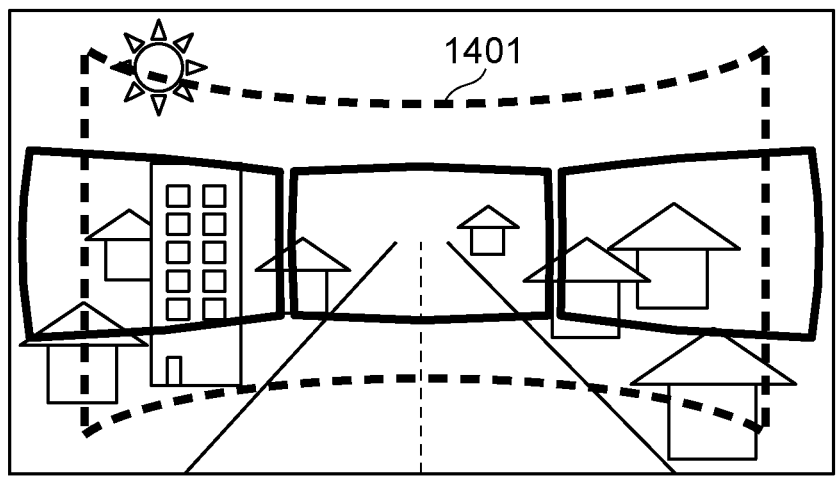
FIG. 14A illustrates an example of the image containing the marker.
Figure 14B:
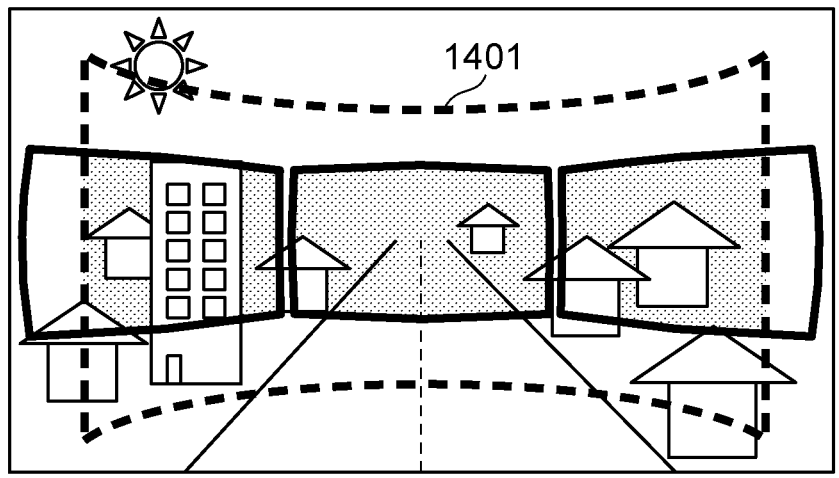
FIG. 14B illustrates an example of the image containing the marker.

In an example described according to the above embodiments, the number of the single first display system is 1. However, the number of the single first display system may not be 1. The marker may be displayed in consideration of the display forms of multiple first display systems. For example, FIGS. 14A-14B illustrate an example of the image containing the marker in consideration of display to a curved screen illustrated in FIG. 13 in addition to display to the first display system that includes the three screens illustrated in FIG. 4. FIG. 14A illustrates dashed lines 1401 that represent a marker suitable for the curved screen in addition to the marker represented by the solid lines suitable for the three screens illustrated in FIG. 8C. At S301 in FIG. 3, display form information on the curved screen is obtained in addition to the display form information on the three screens as the display form information on the first display system. In the processing of generating the image containing the marker in the flowchart in FIG. 5, the curved screen is set to one of the screens to be processed. This enables the marker suitable for the curved screen to be generated. FIG. 14B illustrates an example of the displayed marker, where a range of a logical conjunction of the cutting ranges suitable for the three screens and the cutting range suitable for the curved screen is colored. At least one or more markers may be selected from markers suitable for the display forms, and the selected marker may be displayed. This enables the marker to be displayed in consideration of the display forms of display devices and enables imaging to be supported on the assumption that there are multiple display environments.

Figure 18:
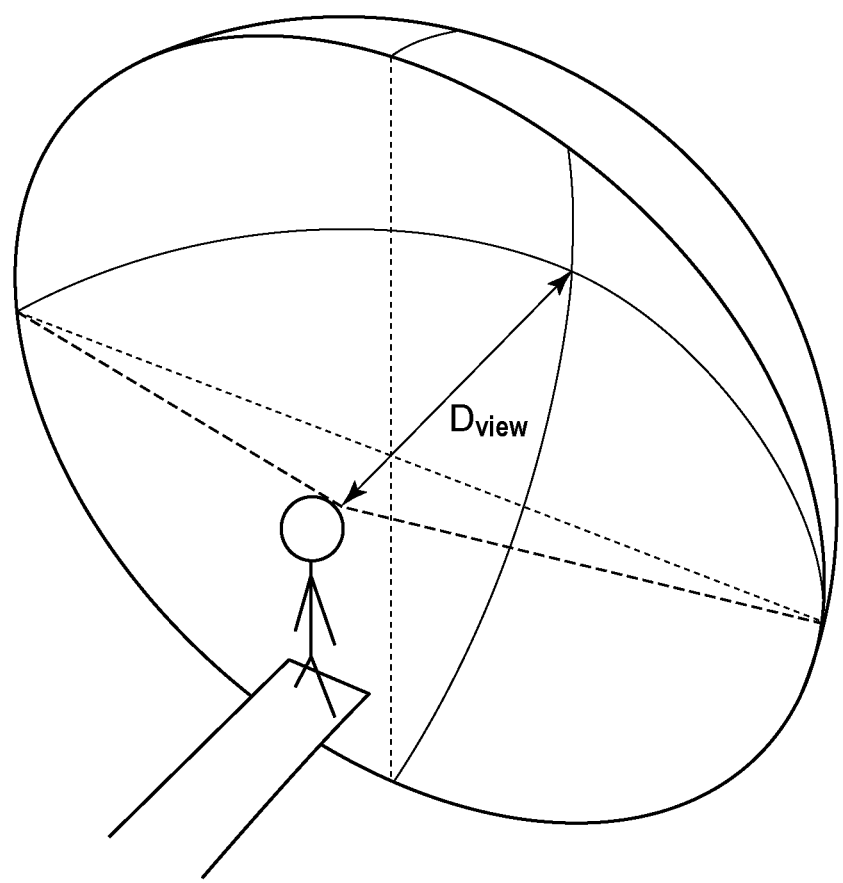
FIG. 18 illustrates an example of a spherical screen.
Figure 19:
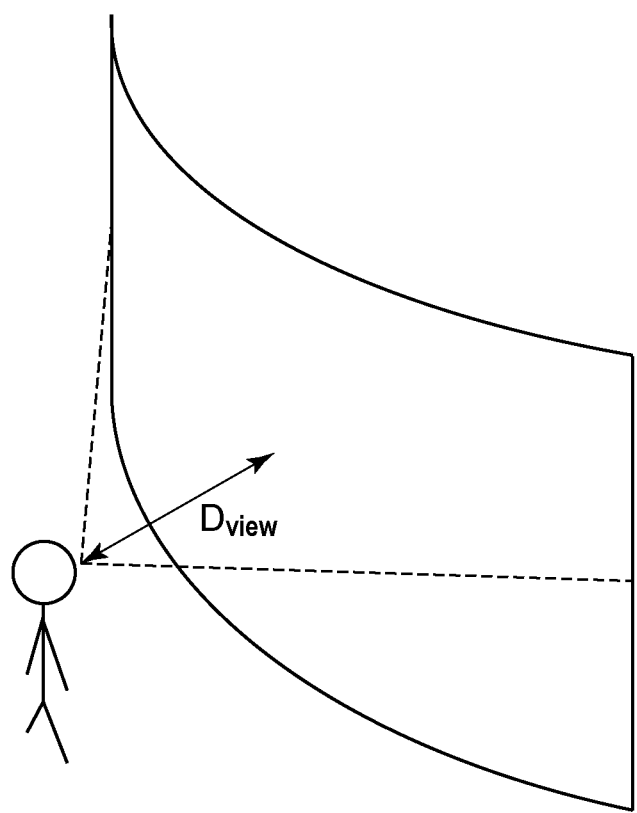
FIG. 19 illustrates an example of a curved screen.
Figure 20:
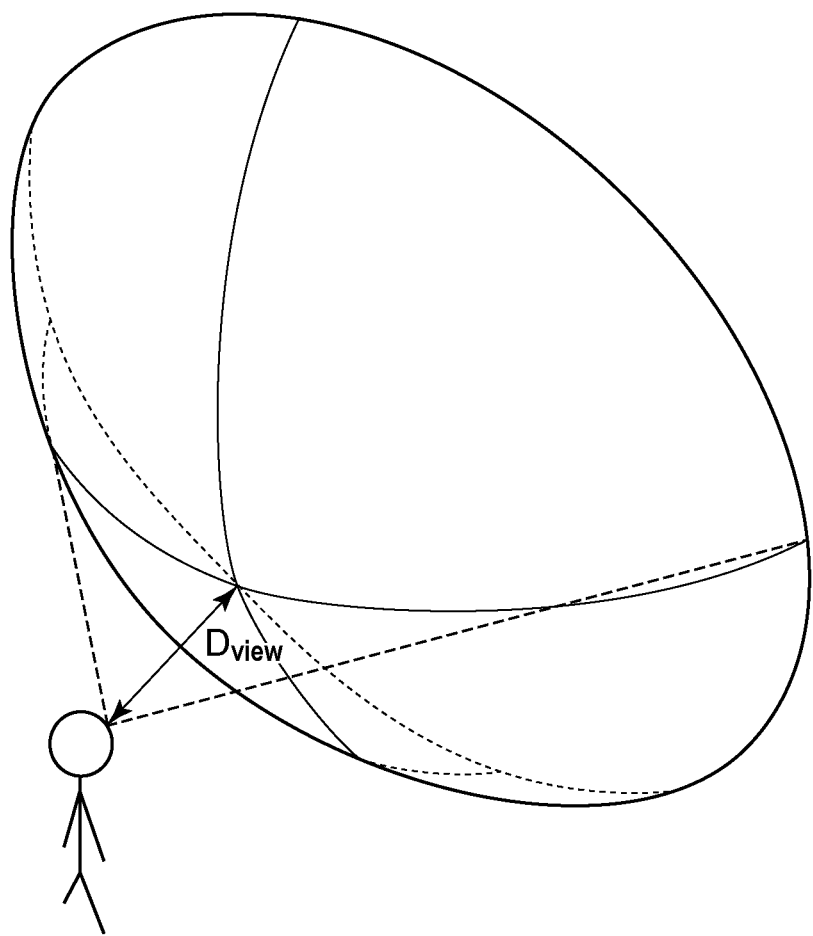
FIG. 20 illustrates an example of a spherical screen.

In an example described according to the above embodiments, the first display system includes the three screens or the curved screen surrounding the viewer. However, the shapes of the screens are not limited thereto. The same processes can also be performed, for example, regarding a spherical screen illustrated in FIG. 18. The same processes can also be performed regarding a display or a screen that has a convex surface facing the viewer. The same processes can also be performed, for example, regarding a curved screen having a shape of a cut part of the side surface of a cylinder illustrated in FIG. 19 and regarding a spherical screen having a shape of a part of a sphere illustrated in FIG. 20.

According to the above embodiments, the color of the marker may be monochromatic such as black or may be set to color that differs from the color of a pixel by referring the pixel value thereof of the input image. The color of the marker may be determined depending on the brightness of surroundings. Specifically, it can be thought that the color is set to high luminance color under fine weather such that the visibility of the marker is improved, high saturation prominent color under cloudy weather, and dark color in the midnight or in a darkroom such that it is not too bright. A process of emphasizing the marker by increasing line thickness may be performed to improve the visibility of the marker. Not only the color of the frame that represents the cutting range relative to each screen but also the color of the inside thereof may be changed. The cutting range may be emphasized by decreasing the luminance outside the cutting range.

In an example described according to the above embodiments, the frame that represents the cutting range relative to each screen is superimposed as the marker. However, the entire frame may not be the marker, but information that represents the position of a corner of the frame may be added as the marker to the input image.

In an example described according to the above embodiments, a part of the imaged image is cut and displayed by the first display system. However, the process that is performed to display the image is not limited to the cutting process. For example, the image may be displayed by the first display system after geometric transformation. In this case, the range in which the image is displayed depends on a geometric transformation parameter that is used for the geometric transformation.

According to an embodiment of the present invention, information for generating a marker that is suitable for a display device that displays a part of an image that is obtained by imaging can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image-processing apparatus for indicating a range, which is displayed by a device or a system comprising a display area for displaying an image, within an input image, the image-processing apparatus comprising:
   (a) one or more circuits, (b) one or more processors and at least one memory, the at least one memory being coupled to the one or more processors and having stored thereon instructions executable by the one or more processors, or (c) one or more circuits, one or more processors, and at least one memory, the at least one memory being coupled to the one or more processors and having stored thereon instructions executable by the one or more processors, wherein at least one of (1) the one or more circuits or (2) the execution of the instructions cause the image-processing apparatus to function as a plurality of units comprising:
(1) a first obtaining unit configured to obtain information that represents a three-dimensional arrangement of the display area that corresponds to a plurality of flat screens;
(2) a second obtaining unit configured to obtain input image data representing the input image captured by an imaging apparatus to be displayed in the display area;
(3) a third obtaining unit configured to obtain an imaging condition of the input image data captured by the imaging apparatus;
(4) a fourth obtaining unit configured to obtain a viewpoint position for viewing the display area;
(5) an identification unit configured to identify the range, which is displayed in the display area, within the input image based on (a) the input image data, (b) the information, (c) the imaging condition, and (d) the viewpoint position; and
(6) an output unit configured to output, as information that represents the identified range, image data generated by superimposing a marker representing the identified range on the input image data,
wherein a shape of the identified range depends on the three-dimensional arrangement of the display area, and
wherein the marker indicates (a) an area of the input image data, outside the marker, that would be cut off and thus not displayed in the display area that corresponds to a plurality of flat screens and (b) an area of the input image data, inside the marker, that would be displayed in the display area that corresponds to a plurality of flat screens.

2. The image-processing apparatus according to claim 1, wherein the shape of the identified range is not a rectangular shape.

3. The image-processing apparatus according to claim 1, wherein the marker is a frame that indicates the identified range in the input image, and
wherein the generation unit is further configured to generate the image data with the marker by converting a pixel value in a region corresponding to the frame that indicates the identified range in the input image into a predetermined value.

4. The image-processing apparatus according to claim 1, wherein the image data with the marker is generated by adding a predetermined value to a pixel value in a region corresponding to the identified range in the input image.

5. The image-processing apparatus according to claim 1, wherein the identified range is identified by converting a pixel value outside the identified range in the input image into a predetermined value or by subtracting a predetermined value from the pixel value outside the identified range in the input image.

6. The image-processing apparatus according to claim 1, wherein the first obtaining unit is further configured to obtain, as the information that represents the three-dimensional arrangement of the display area, position information that represents a three-dimensional position of an edge of an image display region in the display area.

7. The image-processing apparatus according to claim 6, wherein the position information that is obtained by the first obtaining unit is point group data that represents a coordinate of a point corresponding to the position of the edge.

8. The image-processing apparatus according to claim 1, wherein the information that represents the three-dimensional arrangement of the display area obtained by the first obtaining unit includes at least a size of the display area and arrangement information of the display area.

9. The image-processing apparatus according to claim 1, wherein the device or the system comprising the display area comprises a screen which is one of the plurality of flat screens and a projector that projects an image on the screen.

10. A non-transitory computer-readable medium storing a program which, when executed by a computer comprising a processor and a memory, causes the computer to perform an image processing method for indicating a range, which is displayed by a device or a system comprising a display area for displaying an image, within an input image, the method comprising:
obtaining information that represents a three-dimensional arrangement of the display area that corresponds to a plurality of flat screens;
obtaining input image data representing the input image captured by an imaging apparatus to be displayed in the display area;
obtaining an imaging condition of the input image data captured by the imaging apparatus;
obtaining a viewpoint position for viewing the display area;
identifying the range, which is displayed in the display area, within the input image based on (a) the input image data, (b) the information, (c) the imaging condition, and (d) the viewpoint position; and
outputting, as information that represents the identified range, image data generated by superimposing a marker representing the identified range on the input image data,
wherein a shape of the identified range depends on the three-dimensional arrangement of the display area, and
wherein the marker indicates (a) an area of the input image data, outside the marker, that would be cut off and thus not displayed in the display area that corresponds to a plurality of flat screens and (b) an area of the input image data, inside the marker, that would be displayed in the display area that corresponds to a plurality of flat screens.

11. An image processing method for indicating a range, which is displayed by a device or a system comprising a display area for displaying an image, within an input image, the method comprising:
obtaining information that represents a three-dimensional arrangement of the display area that corresponds to a plurality of flat screens;
obtaining input image data representing the input image captured by an imaging apparatus to be displayed in the display area;
obtaining an imaging condition of the input image data captured by the imaging apparatus;
obtaining a viewpoint position for viewing the display area;
identifying the range, which is displayed in the display area, within the input image based on (a) the input image data, (b) the information, (c) the imaging condition, and (d) the viewpoint position; and
outputting, as information that represents the identified range, image data generated by superimposing a marker representing the identified range on the input image data, wherein a shape of the identified range depends on the three-dimensional arrangement of the display area, and wherein the marker indicates (a) an area of the input image data, outside the marker, that would be cut off and thus not displayed in the display area that corresponds to a plurality of flat screens and (b) an area of the input image data, inside the marker, that would be displayed in the display area that corresponds to a plurality of flat screens.

\* \* \* \* \*